Patented May 7, 1935

2,000,051

UNITED STATES PATENT OFFICE 2,000,051

METAL COMPOUND CONTAINING AN ISOINDOLE NUCLEUS AND PROCESS OF MAKING THE SAME

Jocelyn Field Thorpe, Reginald Patrick Linstead, and John Thomas, Earl's Road, Grangemouth, Scotland No Drawing. Application June 10, 1932, Serial No. 616,570. In Great Britain June 20, 1931

14 Claims. (Cl. 260—11)

This application is a continuation in part of our copending application, Serial No. 500,138, filed December 4, 1930.

In British Patent No. 322,169, there is described the production of what appears to be a new series of coloured compounds, by reaction between bodies of phthalimide or phthalimide type with iron in the presence of ammonia.

It is an object of this invention to produce compounds of the same general nature by employing different initial materials. It is a further object of this invention to produce novel specific compounds, which have not been disclosed in the British patent above referred to. Other and further objects of this invention will appear as the description proceeds.

We have found that coloured compounds which appear to belong to the same general class above referred to, can be obtained by heating a metal or metal compound, excluding an alkali or alkaline earth metal or metal compound, with an o-arylcyanoamide, for example o-cyanobenzamide or o-cyanonaphthoic acid amide.

As instances of metals or metal compounds which may be used, we mention those of the group comprising magnesium, copper, cerium, tin, lead, antimony, bismuth, chromium, molybdenum, tungsten, manganese, iron, cobalt and nickel.

It will be noted that these metals all belong to a class which are generally known to be capable of reaction with nitrogenous organic compounds, for example with o-hydroxy-azo compounds or with porphyrins, to produce complex metallonitrogenous organic compounds. Particular substances which are applicable are, magnesium, magnesium oxide, magnesium carbonate, copper, cupric oxide, cerium, tin, stannous oxide, lead, litharge, molybdenum, tungsten, manganese, manganese carbonate, iron, ferric oxide, cobalt oxide ($Co_3O_4$), nickel and nickelous oxide. The reaction generally requires a high temperature and the reactants may be heated either alone or in the presence of suitable solvents or diluents. The process may be followed where necessary by purification. The products which we obtain appear to belong to one general class. Except for the iron, copper and nickel compounds, the products are as far as we are aware new. The products may be employed in the art of colouring, particularly as pigments.

Generally speaking, they are found to contain metal in a combined form, although in the case of antimony, a product almost free from antimony is obtained, the metal used in the process apparently acting catalytically.

It appears possible to remove combined metal in some or all cases by treatment with sulphuric acid, further it appears there is a gradation in the stability of the metal complexes, the metals of the iron group giving the most stable products, magnesium coming next and antimony being unable to form a metallic derivative under the conditions of reaction.

The metal-containing compounds appear to have substantially the same constitution, or their constitutions appear to be of closely related type, except for the differences due to the presence of differing metals. The metal-free compounds also appear to have substantially the same constitution, these being closely related to that of the metal-containing compounds. Owing to their complex nature, exact determination is hardly possible as will be appreciated from the formulæ following.

The nature of the compounds can be readily illustrated by the magnesium one. This is soluble in boiling quinoline, giving blue solutions from which blue needles, with purple lustre can be obtained. It also dissolves in cold sulphuric acid without evolution of hydrogen to give a dull green solution which on being poured onto ice precipitates a bright slightly greenish-blue solid free from metal. This metal-free compound possesses the peculiar stability and insolubility of the metallic derivative. It is stable to light, and extremely bright, particularly when the substance is in a fine stage of division. It only decomposes slowly in concentrated sulphuric acid in the cold. Hot dilute nitric acid destroys it. It is soluble in quinoline, and is also found to dissolve appreciably in benzophenone, naphthalene, and alicyclic alcohols, such as cyclohexanol and menthol, yielding blue solutions, and in aniline and its homologues giving green solutions. The metal-free compound can be reconverted to the metal-containing one by boiling with metallic magnesium in benzophenone or quinoline, the product obtained being indistinguishable from the original magnesium compound.

As already stated, antimony acts catalytically, giving compounds containing only a trace of metal. This trace can be easily removed by recrystallizing the compound from quinoline, the resulting product being apparently the same as that obtained from the magnesium compound.

As regards the constitution, typical analyses of the magnesium compound are as follows:—

| C | H | N | Mg |
|---|---|---|---|
| 67.8 | 3.7 | 19.5 | 4.5 |
| 67.3 | 3.4 | 19.4 | 4.4 |
| 67.7 | 3.7 | 18.3 | ---- |

The molecule appears to include, as an essential unit an isoindole nucleus with an extracyclic nitrogen atom, this unit being repeated. Almost certainly a system with conjugated double bonds running through the molecule somewhat as follows, is present:—

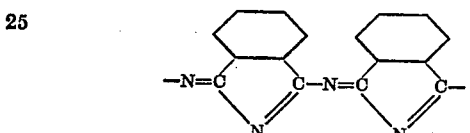

Heating an ortho-aryl-cyanoamide in the presence of a metal, selected according to the instructions given herein, probably results in the production of water and compounds containing the aforementioned grouping. Further heating in the presence of the metal or metals is believed to cause further condensation of these compounds, with the production of more complicated compounds having one or more of the probable formulas given below. It is, of course, to be understood that the products produced depend to a great extent upon the particular metals selected as well as the conditions under which the reaction is carried out.

The most likely structure for the magnesium-free compound appears to be one of the following:—

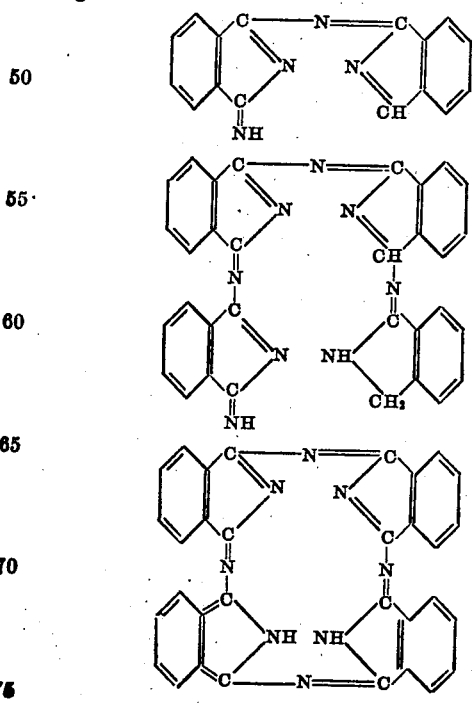

While for the magnesium-containing compounds the following are suggested:—

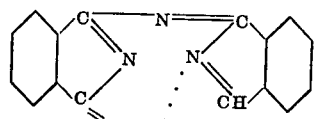

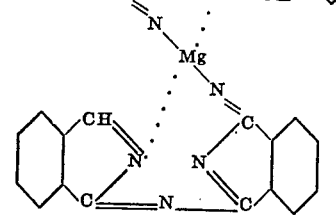

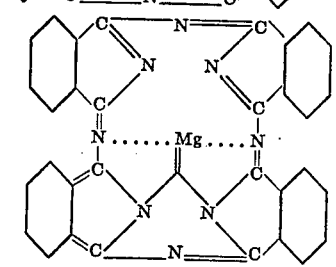

The following examples are given as illustrating several embodiments of the invention, but it is to be understood that the invention is in nowise limited thereto.

*Example 1*

This describes the production of phthalic acid diamide, an intermediate product for the production of orthocyanobenzamide, the conversion of the phthalic acid diamide to ortho-cyanobenzamide, and the treatment of the ortho-cyanobenzamide with iron filings.

(a) This describes the production of phthalic acid diamide, an intermediate product for the production of orthocyanobenzamide. 2000 parts of phthalimide are covered with 5280 parts of aqueous ammonia (e. g. .880), and allowed to stand for two days. The diamide remains as a fine white crystalline powder, and is filtered and dried at 100° C. The yield is about 200 parts, the product melting at 220° C. with decomposition. Instead of allowing the ammonia to stand on the phthalimide, the reaction can be carried out with stirring. It will also have the effect of quickening it.

(b) This describes the conversion of the phthalic acid diamide to ortho-cyanobenzamide. 162 parts of the diamide are mixed with 590 parts of acetic anhydride, and the mixture is heated to boiling as quickly as possible, vigorous boiling under reflux being continued until the solution is clear, which may take about 80 minutes. The liquid is then set aside to cool. The ortho-cyanobenzamide which separates is filtered off, washed first with glacial acetic acid then with alcohol, and dried at 100° C.

(c) This describes the treatment of the ortho-cyanobenzamide with iron filings. 40 parts of ortho-cyanobenzamide and 16 parts of iron filings are intimately mixed and heated in an oil bath. The temperature is indicated by two thermometers, one in the mixture and one in the heating medium. The temperature of the mixture is raised to 240° C. and maintained between 235° C. and 245° C. for three quarters of an hour. The product is then cooled, powdered and stirred with double the theoretical quantity of 10% sulphuric acid (calculated on the iron) until hydrogen is no longer evolved. Alternatively, the powdered material can be left overnight in the acid, and stirred for an hour or two in the morning. It is filtered, washed with water and stirred with 10% caustic soda (100 cc.) for half an hour, and filtered. The solid is finally washed with boiling water, warmed with a little alcohol for a few minutes, filtered and dried at 100° C.

Example 2

This describes a modified method for preparing the starting material ortho-cyanobenzamide, one method of which has been given in section (b) of Example 1. 146 parts of phthalic acid diamide are completely dissolved by boiling for 60 minutes with a mixture of 180 parts of acetic acid and 216 parts of acetic anhydride, the solution being allowed to cool and the product separating removed by filtration.

Example 3

This describes a process for the treatment of ortho-cyanobenzamide using magnesium powder. 36 parts of ortho-cyanobenzamide prepared for instance either according to section (b) of Example 1, or according to Example 2, and 6 parts of coarse magnesium powder are intimately mixed. The mixture is then heated for three quarters of an hour at a temperature of 220° C. The cooled melt is powdered and stirred with 600 parts of 5% sulphuric acid for half an hour. The solid is filtered, washed with water and stirred with 220 cc. of 5% caustic soda for half an hour. The solid is again filtered, washed with boiling water and dried at 100° C. The yield is 18 parts of a bluish-green powder.

Example 4

This describes another process for the treatment of ortho-cyanobenzamide with magnesium. 10 parts of pure ortho-cyanobenzamide prepared for instance according to section (b) of Example 1, or according to Example 2, are heated at 230–240° for 15 minutes or longer according to the actual quantities used, with two parts of the powdered metal. The product is then powdered and extracted successively with dilute caustic soda, 10% sulphuric acid, hot water and finally alcohol.

Example 5

This is an example of the use of a magnesium compound, namely, magnesium oxide, for the treatment of ortho-cyanobenzamide. 40 parts of ortho-cyanobenzamide prepared for example according to section (b) of Example 1, or according to Example 2, 15 parts of naphthalene and 10 parts of magnesium oxide are heated for two hours at 230–240° C. in an enamelled iron pot with a short air reflux and on oil bath. After cooling the hard residue is powdered and extracted with acetone until free from naphthalene and a slight amount of a soluble green impurity present. It is then freed from excess of magnesium by treatment with dilute acid, washed with water and dried.

Example 6

This is an example of the production of a substantially metal-free compound from antimony and ortho-cyanobenzamide. 40 parts of ortho-cyanobenzamide, prepared for instance according to section (b) of Example 1, or according to Example 2, 10 parts of powdered metallic antimony, and 20 parts of naphthalene are heated at 260° C. for one hour. The powdered product is then extracted with acetone, caustic soda and hot water until free from naphthalene and phthalimide. Further purification can be carried out by dissolving out the pigment with boiling quinoline.

Example 7

This is an example of the production of a substantially metal-free compound from the magnesium-containing compound. This latter in the form of the purified compound, obtained for example after recrystallization from quinoline, is ground with a minimum quantity of concentrated sulphuric acid of about 96% strength to give efficient wetting and grinding. The acid is cooled to −10° C. before the grinding, and the temperature is kept at about this during the grinding operation. When solution has been effected it is filtered through sintered glass or other medium suitable for use in filtering concentrated sulphuric acid, and carefully diluted by mixing with ice. The blue precipitate is then filtered, washed free from acid and dried.

Example 8

This is an example of the conversion of a metal-free compound into a metallic compound, namely the conversion of the metal-free compound of Example 6 into the corresponding magnesium compound. 380 parts of the metal-free pigment obtained according to Example 6 are heated together with 15 parts of magnesium powder in boiling benzophonone at 307° C. for several hours. The product after recrystallization appears to be identical with the magnesium contained in one obtained by direct synthesis.

Example 9

The following table gives examples of the products obtained by reacting with further metal compounds, using ortho-cyanobenzamide in every case.

| Metal or metal compound | Temperature | Product |
|---|---|---|
| | Degrees | |
| Nickel | 250 | Lustrous purple powder giving nickel oxide on ignition. |
| NiO | 250 | Deep blue powder with purple lustre. |
| Co₃O₄ | 260 | Blue solid containing cobalt. |
| Chromium | 245 | Dark green; giving a blue-green solid after sulphuric acid treatment. |
| Bi₂O₃ | 245 | Dull green; giving a bright blue-green solid from sulphuric acid. |
| MnCO₃ | 245 | Dark purple; giving a blue solid from sulphuric acid. |
| PbO | 300 | Dull blue; much brighter after treatment with sulphuric acid. |

Example 10

Some further examples are given in the following table, using ortho-cyanobenzamide as starting material but with different media:—

| Metal or metal compound | Temperature | Medium |
|---|---|---|
| | Degrees | |
| Litharge | 300 | None. |
| Ferrous sulphide | 235 | None. |
| Magnesium oxide | 230 | Naphthalene. |
| Magnesium carbonate | 235 | Naphthalene. |
| Iron | 240 | Anthracene. |

As many apparently widely different embodiments of this invention may be made without departing from the spirit and scope thereof, it is to be understood that we do not limit ourselves to the specific embodiments thereof except as defined in the appended claims.

The quantity of metal or metallic compound employed may be varied within wide limits. In the above examples, the ratios vary from ⅛ to ⅖ parts by weight of the metal to 1 part of the cyanoarylamide; in molal ratios the variations in the examples are from ⅓ to 1 mole of the metal body to 1 mole of the cyanoarylamide. These proportions are, however, merely illustrative. For, as shown, the reaction need not go to complete consumption of the reactants, and the excess of initial material in any event can be removed by successive treatment with dilute alkali and dilute acid.

The temperature in the various examples varied from 220° C. to 300° C.; but this is again merely illustrative, not limitative, as long as the temperature is high enough to give a stirrable liquid mass with the particular medium employed (if any).

We claim:

1. A process for the production of a colored compound which comprises heating o-cyanobenzamide in the presence of magnesium.

2. A process for the production of a colored compound which comprises heating o-cyanobenzamide in the presence of antimony.

3. The product produced according to the process of claim 1.

4. The product produced according to the process of claim 2.

5. The process of producing a coloring compound which comprises heating an o-aryl-cyanoamide with a metal of the type which is generally capable of reaction with nitrogenous organic compounds to give complex metallo-nitrogenous organic compounds.

6. A coloring compound of the class producible by a process as defined in claim 5.

7. The process of producing a coloring substance, which comprises heating an o-aryl-cyanoamide at a temperature from 220° to 300° C., in the presence of a metal, said metal being selected from that group whose members are known as capable of forming complex metallo-nitrogenous organic compounds, and being present in the ratio of from ⅓ to 1 mole per mole of the o-arylcyanoamide.

8. The process of producing a coloring substance, which comprises heating a cyano-benzamide at a temperature from 220° to 300° C., in the presence of a metal, said metal being selected from that group whose members are known as capable of forming complex metallo-nitrogenous organic compounds, said metal-containing body being present in a ratio of from ⅛ to ⅖ parts by weight for each part of the cyano-benzamide.

9. A process as in claim 7, followed by the steps of successive extraction of the reaction mass with dilute acid and dilute alkali to remove unchanged initial material.

10. A process as in claim 8, followed by the steps of successive extraction of the reaction mass with dilute acid and dilute alkali to remove unchanged initial material.

11. The process which comprises heating o-cyanobenzamide at temperatures between 200° C. and 300° C. in the presence of a finely divided polyvalent metal.

12. The process which comprises heating o-cyanobenzamide at temperatures between 200° C. and 300° C. in the presence of finely divided iron.

13. Products produced according to the process defined in claim 11.

14. Products produced according to the process defined in claim 12.

REGINALD PATRICK LINSTEAD.
JOCELYN FIELD THORPE.
JOHN THOMAS.